United States Patent
Lohan (10) Patent No.: US 8,160,124 B1
(45) Date of Patent: Apr. 17, 2012

(54) DIFFERENTIAL TEAGER-KAISER-BASED CODE TRACKING LOOP DISCRIMINATOR FOR MULTIPATH MITIGATION IN A NSS RECEIVER

(75) Inventor: Elena Simona Lohan, Tampere (FI)

(73) Assignee: Qualcomm Atheros, Inc., San Jose, CA (US)

( * ) Notice: Subject to any disclaimer, the term of this patent is extended or adjusted under 35 U.S.C. 154(b) by 439 days.

(21) Appl. No.: 12/604,156

(22) Filed: Oct. 22, 2009

(51) Int. Cl.
*H04B 1/707* (2011.01)
*G01S 19/30* (2010.01)

(52) U.S. Cl. ............... 375/149; 375/150; 342/357.69

(58) Field of Classification Search .......... 375/142, 375/145, 149, 150, 343; 342/357.51, 357.61, 342/357.63, 357.69
See application file for complete search history.

(56) References Cited

U.S. PATENT DOCUMENTS

| 5,737,362 | A * | 4/1998 | Hyun et al. ............ 375/149 |
| 6,493,378 | B1 | 12/2002 | Zhodzishsky et al. |
| 6,687,316 | B1 | 2/2004 | McGraw |
| 7,324,607 | B2 | 1/2008 | Guchhait |
| 2004/0057505 | A1* | 3/2004 | Valio .................. 375/148 |
| 2007/0211793 | A1* | 9/2007 | Han ................... 375/150 |
| 2009/0168852 | A1* | 7/2009 | Shirai ................. 375/150 |
| 2009/0213912 | A1* | 8/2009 | Brenner ............... 375/150 |

FOREIGN PATENT DOCUMENTS

| EP | 1288672 A1 | 3/2003 |
| EP | 1909398 A1 | 4/2008 |

OTHER PUBLICATIONS

Bhuiyan, Mohammad Z. H. et al. "Code Tracking Algorithms for Mitigating Multipath Effects in Fading Channels for Satellite-Based Positioning", EURASIP Journal on Advances in Signal Processing, vol. 2008, 2008, 17 pgs.

Hamila, Ridha et al. "Subchip Multipath Delay Estimation for Downlink WCDMA System Based on Teager-Kaiser Operator", IEEE Communications Letters, vol. 7, No. 1, Jan. 2003, 3 pgs.

Lohan, Elena S. et al. "Feedforward Delay Estimators in Adverse Multipath Propagation for Galileo and Modernized GPS Signals", EURASIP Journal on Applied Signal Processing, vol. 2006, 2006, pp. 1-19.

Van Dierendonck, A. J. et al. "Theory and Performance of Narrow Correlator Spacing in a GPS Receiver", Navigation: Journal of The Institute of Navigation, vol. 39, No. 3, Fall 1992, pp. 265-283.

* cited by examiner

*Primary Examiner* — Betsy Deppe
(74) *Attorney, Agent, or Firm* — Bever, Hoffman & Harms, LLP (57) ABSTRACT

A discriminator for a code tracking block of a navigation satellite system (NSS) receiver is provided. This discriminator can advantageously use only four complex correlators, i.e. early (E), prompt (P), late (L), and one of very early (VE) and very late (VL), while providing optimized multipath mitigation. This NSS discriminator can be derived from the first-order derivative of a Teager-Kaiser (TK) operator. This differential TK (DiffTK) discriminator is more sensitive to multipath dispersions than other discriminators or correlators, thereby providing enhanced performance in the presence of multipath.

6 Claims, 7 Drawing Sheets

DIFFERENTIAL TEAGER-KAISER-BASED CODE TRACKING LOOP DISCRIMINATOR FOR MULTIPATH MITIGATION IN A NSS RECEIVER

BACKGROUND OF THE INVENTION

1. Field of the Invention

The present invention generally relate to a navigation satellite system (NSS) receiver, and more specifically to a differential Teager-Kaiser-based code tracking loop discriminator for multi-path mitigation used in the receiver.

2. Description of the Related Art

One popular system for terrestrial location and velocity estimation, known in the art as the global positioning system (GPS), comprises a set of orbiting satellites, ground control stations, and user devices known generally as GPS receivers. A GPS receiver conventionally includes an antenna, a radio frequency front end, down conversion circuitry, an analog to digital converter subsystem, and a digital signal processing subsystem. The GPS receiver computes a location based on a set of signals received from a corresponding set of satellites, each with a known orbital pattern. To accurately compute a location, the GPS receiver needs to receive a satellite signal from a minimum set of typically four satellites. Each satellite signal includes position ("ephemeris") and time information modulated by a wide band pseudorandom noise (PRN) code. A PRN code comprises a sequence of "chips," wherein the sequence or a sub-sequence thereof forms a code signifying one bit of data. Different PRN codes and bit rates may be used for different purposes. For example, one PRN code is referred to in the art as a coarse acquisition (CA) code, and comprises 1023 chips. The chips are transmitted at a rate of 1.023 MHz.

Each satellite signal typically arrives at the GPS receiver below a typical receiver noise floor. However, the GPS receiver knows each PRN code and is able to correlate the satellite signal with known PRN code, thereby imparting processing gain on the data and timing information encoded by the transmitted PRN code. With sufficient processing gain, the satellite signals may be recovered by the GPS receiver.

Each satellite signal ideally follows a direct line-of-sight (LOS) path from a corresponding satellite, through the atmosphere, to the GPS receiver. However, one or more of the satellite signals may actually follow multiple paths as a result of reflecting off buildings or the ground before arriving at the GPS receiver, thereby giving rise to multipath errors. Multipath errors directly impact code tracking performance, which leads directly to measurement errors. Multipath errors are commonly measured relative to chip time.

Multipath mitigation for GPS falls into two primary categories, including receiver-external approaches and receiver-internal approaches. Receiver external approaches use techniques that are independent of the receiver hardware or software, such as using antenna design and antenna placement. Receiver internal approaches may include measurement processing (navigation) level or signal processing level techniques. Measurement processing approaches use calibration and repetitive sampling using signals from multiple satellites to estimate corrections for current and future measurements. Signal processing approaches conventionally use known characteristics of LOS and multipath signals at link level (i.e. taking into account the signal from one satellite at a time) to attenuate effects of the multipath signal. One conventional signal processing approach uses multiple correlators to estimate parameters of the LOS and multipath signals to track and mitigate multipath errors.

A second approach may track the LOS signal by separating the LOS signal from multipath replicas. This technique uses a multi-correlator sampling of autocorrelation functions and may also use discriminator curves. Additional correlators beyond early, late, and prompt correlators are often required along with wider bandwidth in certain system elements. This second approach has varying effectiveness depending on multipath signal characteristics. For example, as a multipath parameter is closer to a LOS parameter, the less effective this approach is in distinguishing the multipath signal from the LOS signal. Thus, tracking only the LOS signal tends to be more effective in scenarios with long multipath delays and a high signal to noise ratio (SNR). However, users frequently encounter usage scenarios with shorter multipath delays and lower SNRs, which can significantly degrade performance and accuracy of this second approach.

Therefore, a technique for more robust multipath mitigation in a navigation satellite system (NSS) receiver is needed.

SUMMARY OF THE INVENTION

A discriminator for a code tracking block of a navigation satellite system (NSS) receiver is provided. This NSS discriminator can advantageously use only four complex correlators, i.e. early (E), prompt (P), late (L), and one of very early (VE) and very late (VL), while providing optimized multipath mitigation. The NSS discriminator can be derived from a first-order derivative of a Teager-Kaiser (TK) operator. This differential TK (DiffTK) discriminator is more sensitive to multipath dispersions than other discriminators or correlators, thereby providing enhanced receiver performance in the presence of multipath.

A navigation satellite system (NSS) receiver configured to detect information within pseudo-random noise (PRN) modulated electromagnetic signals can include this DiffTK discriminator. For example, the NSS receiver can include an antenna configured to receive a plurality of electromagnetic signals and convert the electromagnetic signals into electrical signals. An analog subsystem can be configured to selectively amplify the electrical signals, shift a specific frequency range within the electrical signals to generate an intermediate frequency signal, and sample the intermediate frequency signal into a digital converted signal. At least one tracking block can be configured to minimize timing differences between a reference PRN signal and the converted digital signal.

Each tracking block can include at least one code tracking loop. The code tracking loop can generate four input terms corresponding to correlations between the digital converted signal and a phase shifted reference PRN signal. Notably, the four input terms consist of an early (E) input term, a prompt (P) input term, a late (L) input term, and one of a very early (VE) input term and a very late (VL) input term. To generate these four input terms, the code tracking loop can include a correlator block for generating the four input terms, wherein each input term is a correlation between a phase shifted reference PRN signal and the NSS signal. The code tracking loop can also include the DiffTK discriminator that uses the four input terms to determine phase differences between the PRN modulated NSS signal and the reference PRN signal. The discriminator output corresponds to at least a portion of a timing difference between the reference PRN signal and the PRN modulated NSS signal.

The NSS receiver can further include a clock generator configured to generate a code timing clock based on the discriminator output. A code generator can be configured to compute the reference PRN signal and to generate a set of phase shifted reference PRN signals based on the reference PRN signal and the code timing clock.

The correlator block can be configured to receive a first data signal, a second data signal (which is a phase-shifted version of the first data signal), and a set of phase shifted reference PRN signals. Using these signals, the correlator block can generate a first set of correlation signals and a second set of correlation signals. The first set of correlation signals can be based on the first data signal and the phase shifted reference PRN signals. The second set of correlation signals can be based on the second data signal and the phase shifted reference PRN signals. Notably, the first set of correlation signals is a phase-shifted version of the second set of correlation signals. The first and second sets of correlation signals correspond to the four complex correlators.

DETAILED DESCRIPTION OF THE DRAWINGS

A navigation satellite system (NSS) is a generic term for any satellite navigation system that provides position determination capability with global or regional coverage. Global Positioning System (GPS) is one such NSS operated by the United States to provide global coverage. Another global NSS is GLONASS, which is operated by Russia. Yet other global NSSs (not yet fully operational) include Galileo, which will be operated by the European Union, and Beidou (also called Compass or Big Dipper), which will be operated by China. Other regional NSSs include QZSS, which is operated by Japan, and IRNSS, which is operated by India.

Figure 1:
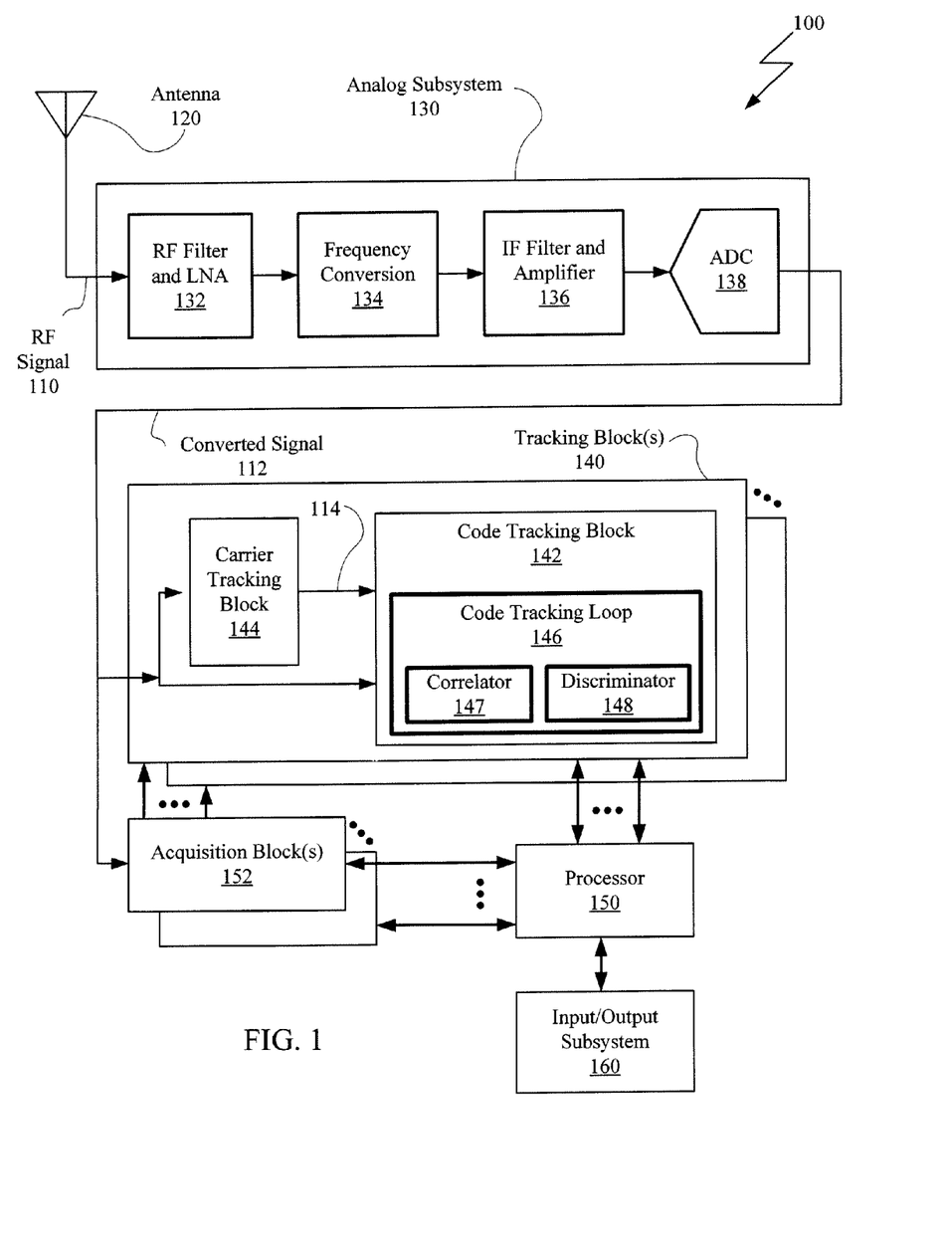
FIG. 1 illustrates an exemplary navigation satellite system (NSS) receiver.

FIG. 1 illustrates an exemplary NSS receiver 100. NSS receiver 100 can include an antenna 120, an analog subsystem 130, at least one tracking block 140, at least one acquisition block 152, a processor 150, and an input/output subsystem 160. Antenna 120 can receive electromagnetic signals from a plurality of satellites (not shown), and can convert a superposition of the electromagnetic signals into an electrical RF signal 110. Antenna 120 may comprise any technically feasible structure, such as a quadrifilar helix (or just "quad helix"), a microstrip "patch," or a set of planar rings (a "choke"). RF signal 110 is conveyed over an electrically conductive means, such as a circuit board trace, to analog subsystem 130 for processing.

Each satellite signal includes a data payload bit stream modulated as a sequence of "chips" per bit of payload data. For example, a digital "1" in the data payload bit stream may be modulated as a first chip sequence of "1's" and "0's," while a "0" in the data payload bit stream may be modulated as a different chip sequence of "1's" and "0's." Each satellite uses a unique sequence of chips to represent a data payload value of "1" or "0." Chip data associated with a given satellite is referred to herein as satellite chip data. A super-position of multiple satellite chip data streams is represented in RF signal 110 and in a converted signal 112 (described below).

Analog subsystem 130 can include a radio frequency (RF) filter and low noise amplifier (LNA) 132, a frequency conversion unit 134, and an intermediate frequency (IF) filter and amplifier 136, and an analog-to-digital converter (ADC) 138. RF filter and LNA 132 can include frequency selection circuitry and low noise amplification circuitry that generates an amplified RF signal from RF signal 110. Certain frequency ranges within RF signal 110 are preferentially amplified to produce the amplified RF signal, while other frequency ranges within RF signal 110 are typically attenuated.

Frequency conversion unit 134 can generate an intermediate frequency signal from the amplified RF signal. The intermediate frequency signal comprises a range of frequencies from the amplified RF signal that is shifted down in frequency. In one embodiment, a mixer combines the amplified RF signal with a local oscillator signal to produce the intermediate frequency signal. A local oscillator (not shown) may comprise a frequency synthesizer, or any other technically feasible signal source suitable for generating the local oscillator signal for use in the mixer. The mixer (not shown) combines the local oscillator signal and the amplified RF signal to produce frequency images at difference frequencies between the amplified RF signal and the local oscillator signal. For example, to convert an RF signal with a base band signal bandwidth of 1 MHz centered at 1000 MHz to an IF signal centered at 10 Mhz, the local oscillator may operate at 990 MHz. When the mixer combines the RF signal with the local oscillator signal, the 1 MHz base band signal is replicated at an image of 10 MHz and an image of 1990 MHz. An intermediate frequency filter centered at 10 MHz removes the 1990 MHz image along with the original signals of 1000 MHz and 990 MHz.

IF filter and amplifier 136 can include a filter configured to selectively pass frequencies within a specified band about the IF frequency center, and reject frequencies outside the band. The frequency band defines a given filters bandwidth. Persons skilled in the art will recognize that more than one frequency conversion unit 134 may be used in combination with one or more IF filter and amplification unit 136 for performing frequency conversion functions without departing the scope of the invention. A final intermediate frequency stage filter bandwidth generally sets a pre-correlation bandwidth.

ADC 138 converts an analog signal from an analog domain to a digital domain to generate a converted signal 112. In one embodiment, ADC 138 comprises two ADC modules, wherein a first ADC module is configured to generate a sample based on in-phase ("I") timing and a second ADC module is configured to generate a sample based on quadrature ("Q") timing. In this embodiment, converted signal 112 can include independent "I" and "Q" samples. The ADC modules quantize an analog signal value into a corresponding digital code. In one embodiment, a two-bit digital code is generated by the ADC modules to yield four quantization levels. In an alternative embodiment, a four-bit digital code is generated by the ADC modules to yield sixteen quantization levels. ADC 138 may include analog circuitry necessary for detecting or processing analog base band satellite signals prior to quantization. ADC 138 should capture digital samples at a rate corresponding to at least a pre-correlation bandwidth. Wide pre-correlation bandwidth, such as a full bandwidth (e.g. 20 MHz for GPS), requires a similarly wide front-end bandwidth in RF Filter and LNA 132. Susceptibility to interference grows as a function front-end bandwidth.

Therefore, systems that require less pre-correlation bandwidth are generally more immune to interference.

Tracking block 140 can include a carrier tracking block 144 and a code tracking block 142. Carrier tracking block 144 can be configured to track a given satellite carrier frequency to compensate for Doppler frequency shifts and related phase shifts associated with motion of the satellite with respect to NSS receiver 100. Carrier tracking block 144 may include a correlator (not shown) configured to generate a selective response to a specific bit sequence and a standard discriminator (not shown) configured to generate a frequency and phase estimate of an incoming signal with respect to a locally generated reference signal. Carrier tracking block 144 provides a coarse acquisition function and generates a rate aiding signal 114 used by code tracking block 142 to narrow a search aperture for a given satellite chip data stream.

Code tracking block 142 comprises a code tracking loop 146 configured to detect chip timing and phase information from a specific satellite chip data stream out of a plurality of satellite chip data streams represented within converted signal 112. Code tracking loop 146 includes a correlator 147, a discriminator 148, and related circuitry used to perform closed-loop code tracking on one satellite chip data stream. Correlator 147 is configured to selectively respond to specific chip sequences associated with a given satellite. Discriminator 148 can be configured to detect phase (i.e. timing) differences between the satellite chip data stream (typically modulated with a pseudo-random noise (PRN) code) and a locally generated chip data stream.

In one embodiment, code tracking block 142 further includes a digital locked loop (DLL) (not shown) configured to maintain code lock between the satellite chip data stream embedded within converted signal 112 and the locally generated PRN code. When the locally generated copy of the PRN code is phase aligned (code-locked) with a respective satellite signal, data modulated within the satellite signal may be detected and used for measurement computations by a processor 150. Code tracking loop 146 will be discussed in greater detail in FIG. 2.

Input/output subsystem 160 can provide a means for accessing measurement data generated by NSS receiver 100. For example, input/output subsystem 160 may comprise interface logic for attaching NSS receiver 100 to a computation platform such as a cellular phone, personal digital assistant, or personal computer. Alternatively, certain user interface functions can be performed by processor 150 and input/output subsystem 160 can include a display screen and input devices such as user activated buttons. Processor 150 can be configured to generate measurement data, such as location and velocity, using any technically feasible methods. Processor 150 can also be configured to capture data, such as position information, recovered from individual satellite signals by tracking blocks 140.

Each acquisition block 152 can be configured to acquire coarse phase information for one of a plurality of satellites. In certain embodiments, processor 150 can receive acquisition information from a tracking block 140 and a corresponding acquisition block 152 to generate acquisition information, which can be used by that tracking block 140 to acquire and code-lock on a respective satellite chip data stream.

Figure 2:
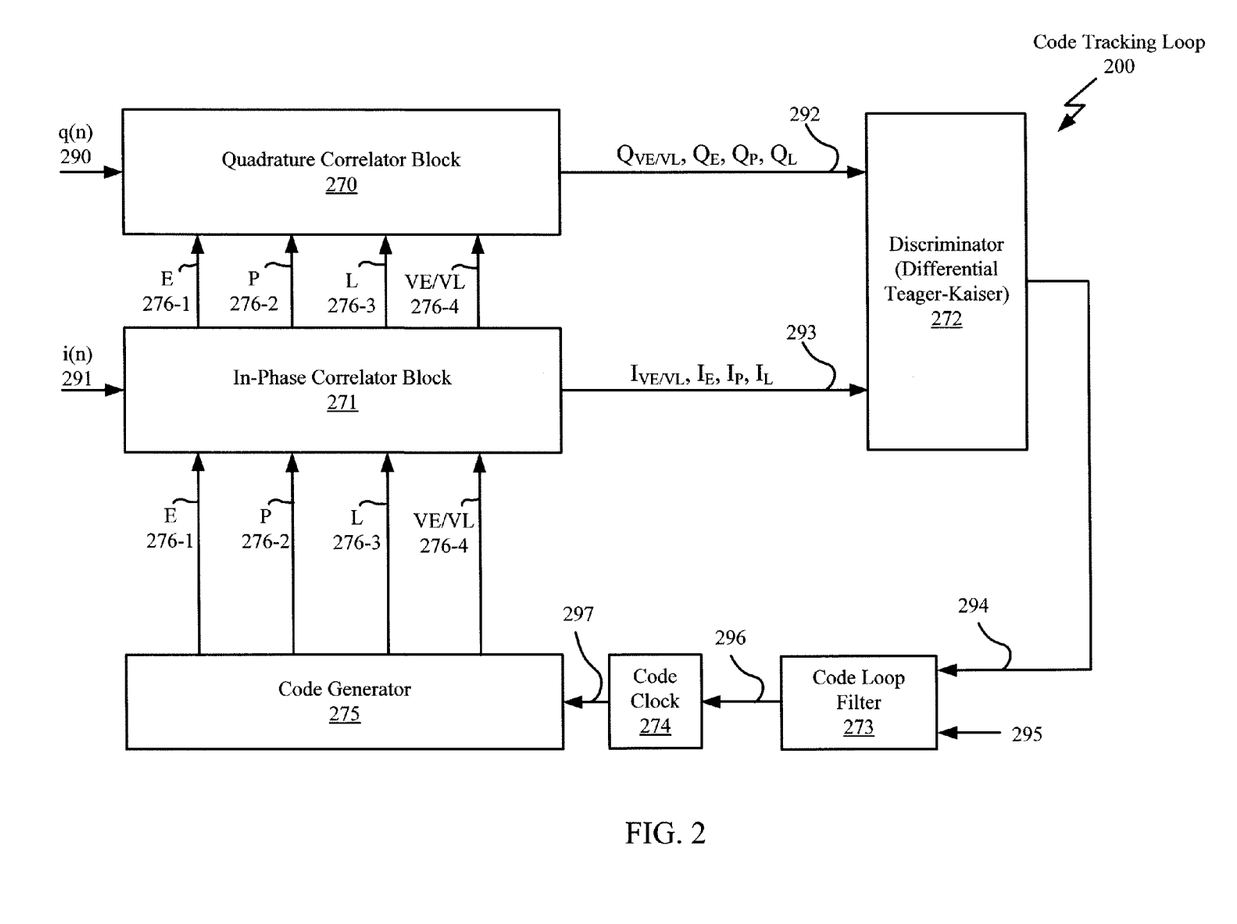
FIG. 2 illustrates an exemplary code tracking loop within the NSS receiver.

FIG. 2 illustrates an exemplary code tracking loop 200 for use within NSS receiver 100. In this embodiment, code tracking loop 200 can include a quadrature correlator block 270, an in-phase correlator block 271, a discriminator 272, a code filter 273, a code clock generator 274, and a code generator 275. As described in further detail below, discriminator 272 can advantageously use a differential Teager-Kaiser operator for providing optimized tracking.

Code generator 275 can be configured to locally generate a PRN code sequence, associated with a PRN code sequence of a specific satellite, based on certain sequence parameters and a PRN clock signal 297. Code generator 275 may generate a plurality of phase-shifted versions of the PRN code sequence ranging from degrees of early through degrees of late with respect to an associated satellite signal. In one embodiment, the code generator 275 can generate four PRN signals 276 (276-1 through 276-4), corresponding to early (E) 276-1, prompt (P) 276-2, late (L) 276-3, and very early (VE) (or very late (VL)) (VE/VL) 276-4 phase of the PRN code sequence. For example, the very early/very late 276-4 signal may be offset from the prompt 276-2 signal by 0.75 chip times. The early signal 276-1 may be early by 0.25 chip times with respect to the prompt signal 276-2 in time, while the late signal 276-3 may be late by 0.25 chip times with respect to the prompt signal 276-2. The timing of the prompt signal 276-2 corresponds to a current timing and phase estimate within code tracking loop 200 for a corresponding satellite signal.

In-phase correlator block 271 receives PRN signals 276 and an in-phase signal i(n) 291, such as the in-phase component from converted signal 112. In-phase correlator block 271 is configured to generate in-phase correlation samples 293 based on in-phase input i(n) 291 and PRN signals 276. For example, in-phase correlation samples 293 may include a IVE (in-phase, very early) signal corresponding to a correlation function between in-phase signal i(n) 291 and very early PRN signal 276-4.

The quadrature correlator block 270 receives the PRN signals 276 and a quadrature signal q(n) 290, such as the quadrature component from converted signal 112. The quadrature correlator block 270 is configured to generate quadrature correlation samples 294 based on the quadrature signal q(n) 290 and the PRN signals 276. In one embodiment, correlator 147 (FIG. 1) can include in-phase correlator block 271 and quadrature correlator block 270.

Quadrature correlation samples 292 and in-phase correlation samples 293 are transmitted to discriminator 272. Using these correlation samples, discriminator 272 (discussed in greater detail in FIG. 3) is configured to detect phase differences between the in-phase input i(n) 291 and the prompt PRN signal 276-2. Discriminator 272 generates a discriminator output signal 294, which indicates whether the phase of the prompt PRN code 276-2 is ahead of, behind, or aligned with the input i(n) 291. In other words, the discriminator output signal 294 indicates a phase difference between the PRN code sequence generated locally by code generator 275 and the satellite signal received at the antenna 120 and encoded within the converted signal 112.

Discriminator output signal 294 and a rate aiding signal 295 are combined within code loop filter 273 to generate a code clock control signal 296. In one embodiment, rate aiding signal 295 can be based on rate aiding signal 114 (FIG. 1), and corresponds to a coarse timing signal acquired from an associated satellite signal. Code loop filter 273 can be configured to implement a low-pass operation on discriminator output signal 294.

Code clock generator 274 can generate the PRN clock signal 297 based on code clock control signal 296. In one embodiment, code clock generator 274 can be implemented with a numerically-controlled oscillator (NCO). Code clock generator 274, code generator 275, in-phase correlator block 271, quadrature correlator block 270, discriminator 272, and code loop filter 273 can form a negative-feedback control loop configured to track phase alignment of the incoming code sequence of in-phase input i(n) 291. When code tracking loop 200 is properly tracking input i(n) 291, transitions on the prompt PRN signal 276-2 are phase-aligned with transitions within the i(n) 291 signal.

Phase differences between the received PRN sequence (in phase input i(n) 291) and the locally generated PRN sequence are reflected in discriminator output signal 294 and code clock control signal 296, which controls code clock generator 274 and resulting phase of the PRN clock signal 297. The phase of PRN clock signal 297 determines the phase of the locally generated PRN sequence. Code clock generator 274 can compensate for phase differences indicated in code clock control signal 296 by adjusting PRN clock signal 297 using a frequency adjustment, a phase adjustment, or both a frequency and a phase adjustment, according to specific implementation requirements.

When the locally generated PRN sequence is ahead of the received PRN sequence in phase, discriminator output signal 294 indicates a positive phase difference, thereby causing code clock generator 274 to adjust PRN clock signal 297 accordingly (decrease frequency, decrease phase shift). In contrast, when the locally generated PRN sequence is behind the received PRN sequence in phase, discriminator output signal 294 indicates a negative phase difference, thereby causing code clock generator 274 to adjust PRN clock signal 297 accordingly (increase frequency, increase phase shift). In one embodiment, inputs q(n) 290 and i(n) 291 arrive phase-aligned within code tracking loop 200; however, quadrature signal q(n) 290 is sampled on a 90 degree offset from I(n) 291 within ADC 138. Persons skilled in the art will recognize that a certain threshold of phase difference between the received PRN code sequence and the locally generated PRN code sequence may exist at any time during normal operation without degrading proper phase lock in the negative-feedback control loop.

Discriminator output signal 294 represents a phase error estimate between PRN clock signal 297 and in-phase input i(n) 291. The phase error estimate is used to adjust code clock generator 274 to track the phase and frequency of in-phase input i(n) 291. Carrier information, such as a pseudorange rate of change based on Doppler shifts in the NSS carrier, from the carrier tracking block 144 may be used to adjust bandwidth of the code loop filter 273 to implement beneficial trade-offs between noise performance and dynamic performance. The carrier information may be conveyed via the rate aiding signal 295.

Discriminator 272 can advantageously mitigate multipath propagation using the above-described four complex PRN signals (i.e. early, late, prompt, and one of very early or very late). Specifically, discriminator 272 can be derived from a first-order derivative of a Teager-Kaiser (TK) operator. The Teager Kaiser (TK) operator is a non-linear operator that gives a measure of the energy of a signal. Therefore, the TK operator can be susceptible to multipath dispersion. By taking a first-order derivative of the TK operator, the multipath error can be forced towards 0, thereby facilitating code tracking loop 200 to work better in the presence of multipath conditions. The TK operator is now described in further detail.

A discrete complex TK operator applied to a signal x(n) (a complex signal) can be written as:

$$\Psi_{TK}(x(n)) = |x(n)|^2 - \frac{1}{2}(x(n-1)x*(n+1) + x*(n-1)x(n+1))$$

where x*(n) is the conjugate of the signal x(n). Notably, the TK operator applied to a de-spread signal, sent via multipath, can show the multipath presence via one or more multiple peaks in the output signal.

For tracking purposes, the zero crossings of the TK discriminator function can be used. Specifically, the zeros of the TK operator's derivative can correspond to the function local maxima (or minima). The TK derivative, $\Psi'_{TK}(x(n))$, in discrete domain, can be approximated by:

$$\Psi_{DiffTK}(x(n)) = \Psi'_{TK}(x(n)) =$$
$$\frac{1}{2}(\Psi(x(n+1)) - \Psi(x(n))) = \frac{1}{2}(|x(n+1)|^2 - |x(n)|^2) - \frac{1}{4}(x(n)x*(n+2) +$$
$$x(n+2)x*(n) - x(n-1)x*(n+1) - x(n+1)x*(n-1))$$

If the in-phase and quadrature notations for the complex signal x(n) are used, then $x(n) = I_P + jQ_P$ $x(n-1) = I_L + jQ_L$ $x(n-2) = I_{VL} + jQ_{VL}$ $x(n+1) = I_E + jQ_E$ $x(n+2) = I_{VE} + jQ_{VE}$ Using these notations, the TK derivative of the signal becomes:

$\Psi_{DiffTK}(x(n)) = (I_E^2 + Q_E^2 - I_P^2 - Q_P^2) - I_P I_{VE} - Q_P Q_{VE} + I_E I_L + Q_E Q_L$ using the VE PRN signal, and $\Psi_{DiffTK}(x(n)) = (\Psi(x(n)) - \Psi(x(n-1))) = (I_P^2 + Q_P^2 - I_L^2 - Q_L^2) + I_P I_{VL} + Q_P Q_{VL} - I_E I_L - Q_E Q_L$ using the VL PRN signal.

During an actual implementation, a correctional bias of, for example, $0.25\Delta_{EL}$ chips can be used (wherein $\Delta_{EL}$ is the early-late spacing, in chips). Note that discriminator 272 can be implemented directly using logic gates or implemented in a more general embedded signal processing architecture.

The TK derivative of the signal advantageously functions similarly to a discriminator output derived using a narrow correlator (e.g. a early-minus-late (ELM) correlator) or a dot-product discriminator. Therefore, the discriminator output is given by:

$D_{DiffTK} = \Psi_{DiffTK}(x(n)) = (I_E^2 + Q_E^2 - I_P^2 - Q_P^2) - I_P I_{VE} - Q_P Q_{VE} + I_E I_L + Q_E Q_L$ using the VE PRN signal, or $D_{DiffTK} = \Psi_{DiffTK}(x(n)) = (I_P^2 + Q_P^2 - I_L^2 - Q_L^2) + I_P I_{VL} + Q_P Q_{VL} - I_E I_L - Q_E Q_L$ using the VL PRN signal.

Figure 3A:
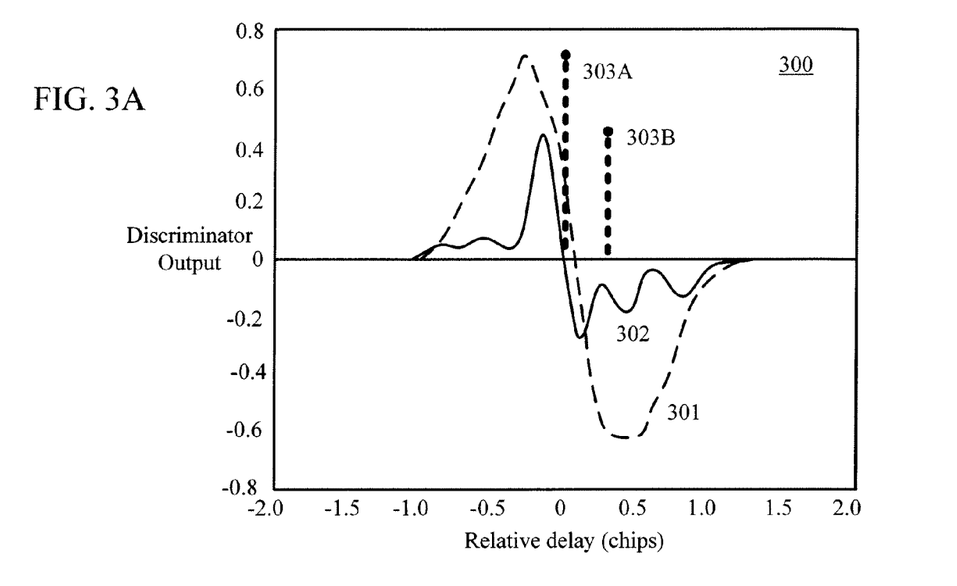
FIGS. 3A-3B illustrate S-curves in a multipath environment for a differential Teager-Kaiser discriminator and a dot-product discriminator for two levels of early-late spacing.
Figure 3B:
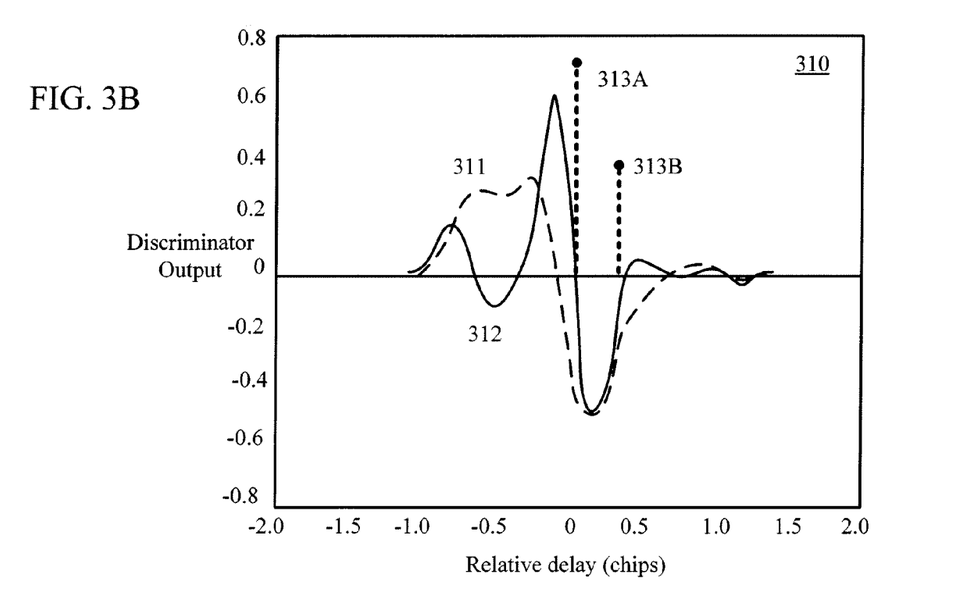

FIGS. 3A and 3B illustrate exemplary graphs 300 and 310, respectively, showing the S-curves (also called discriminator curves) in one multipath environment (without additional additive white noise component). Curves 301 and 311 are associated with a conventional dot-product discriminator (dashed lines), whereas curves 302 and 312 are associated with a differential TK discriminator (solid lines). Paths 303A and 303B (multipath locations) are spaced at 0.3 chips distance with path 303B being 3 dB lower than path 303A. Similarly, paths 313A and 313B are spaced at 0.3 chips distance with path 313B being 3 dB lower than path 313A. Early-late spacing was set to 0.5 chips, and very early-very late spacing was set to 1 chip. Note that graph 300 refers to in-phase paths, whereas graph 310 refers to out-of-phase paths.

As shown in FIGS. 3A and 3B, the dot-product discriminator can identify paths 303A and 313A with relative accuracy, as seen by curves 301 and 311 crossing zero approximately coincident with paths 303A and 303B. Unfortunately, the dot-product discriminator cannot identify paths 303B and 313B. In contrast, the differential TK discriminator can identify paths 303A, 303B, 313A, and 313B with significantly better accuracy, as noted by the zero crossings (in three cases) and a near zero crossing (in one case, for curve 302 with respect to path 303B). Note that identification accuracy can depend on the multipath spacing as well as the early-late spacing.

Figure 4A:
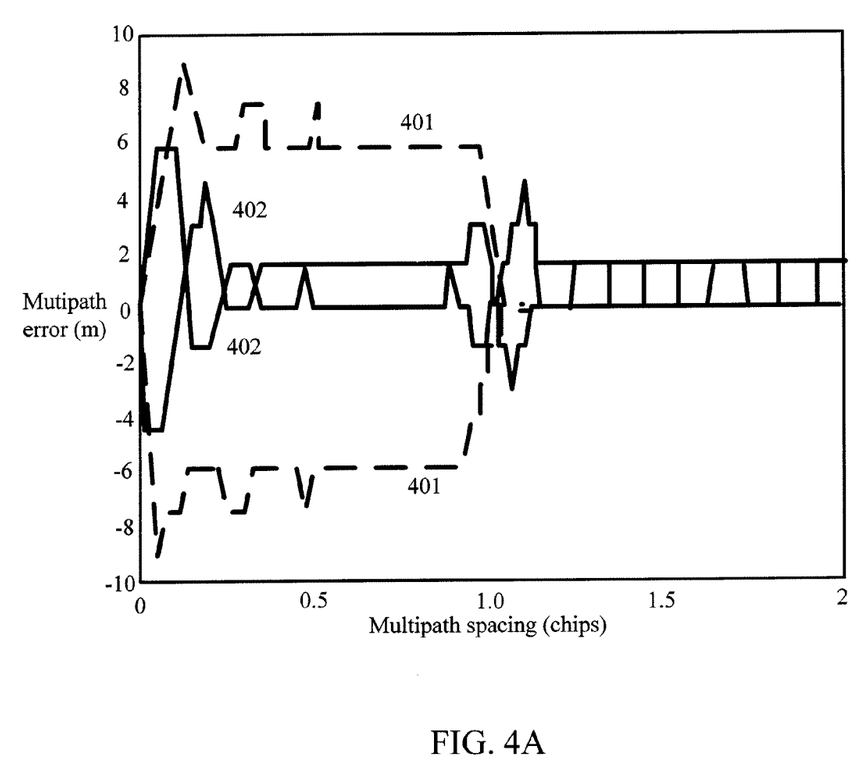
FIGS. 4A-4C illustrate error performance of an exemplary differential Teager-Kaiser discriminator compared to other discriminators for three levels of early-late spacing.

FIG. 4A illustrates an exemplary error performance of a conventional dot-product discriminator versus error performance of the differential TK discriminator for an early-late spacing of 0.1 chips. A vertical axis represents measurement error in meters due to multi-path error, while a horizontal axis represents a single case of multi-path delay. Each trace represents a multi-path error envelope (MEE) for one of two discriminator structures. A first discriminator structure, comprising a conventional dot-product discriminator, is depicted in trace 401 (dashed line). A second discriminator structure, comprising a differential TK discriminator, is depicted in trace 402 (solid line).

Figure 4B:
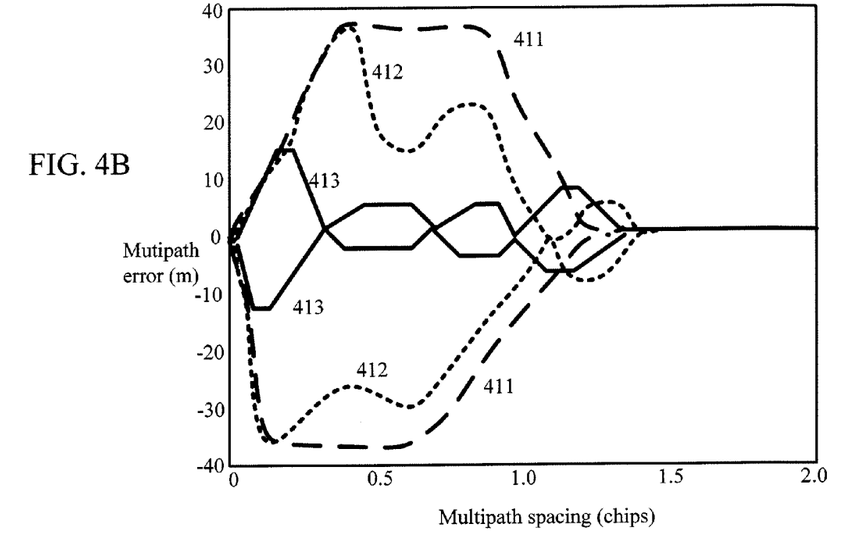

FIG. 4B illustrates an exemplary error performance of a conventional dot-product discriminator, a conventional HRC (high resolution correlator), and the differential TK discriminator for an early-late spacing of 0.5 chips. Thus, in this case, each trace represents a multi-path error envelope (MPE) for one of three discriminator structures. A first discriminator structure, comprising a conventional dot-product discriminator, is depicted in trace 411 (dashed line). A second discriminator structure, comprising a conventional HRC, is depicted in trace 412 (dotted line). A third discriminator structure, comprising a differential TK discriminator, is depicted in trace 413 (solid line).

Figure 4C:
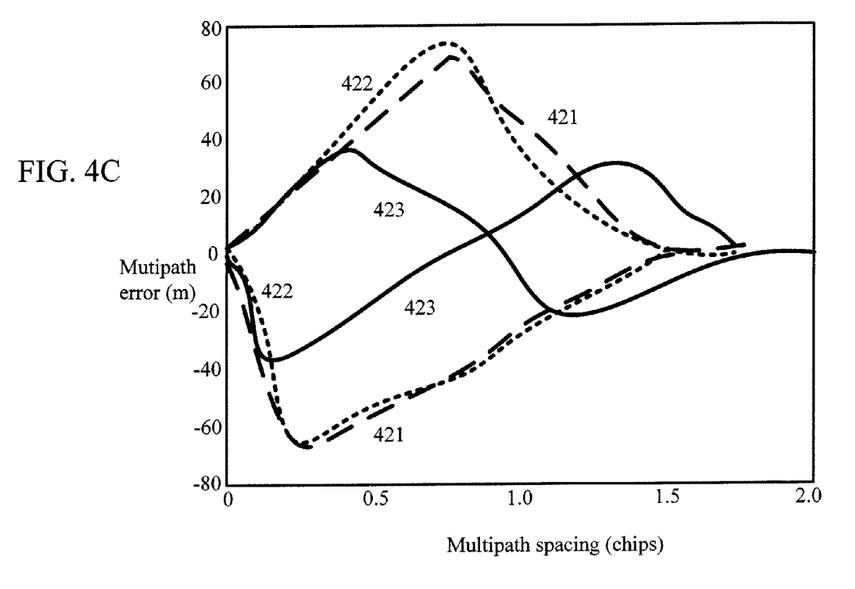

FIG. 4C illustrates an exemplary error performance of a conventional dot-product discriminator, a conventional HRC discriminator, and the differential TK discriminator for an early-late spacing of 1.0 chip. Thus, in this case, each trace represents a multi-path error envelope (MPE) for one of three discriminator structures. A first discriminator structure, comprising a conventional dot-product discriminator, is depicted in trace 421 (dashed line). A second discriminator structure, comprising a conventional HRC, is depicted in trace 422 (dotted line). A third discriminator structure, comprising a differential TK discriminator, is depicted in trace 423 (solid line).

As shown by FIGS. 4A-4C, the differential TK discriminator has significantly better multipath error up to 1 chip path spacing compared to other discriminators/correlators.

The noise performance of the differential TK discriminator is derived below and compared with that of a conventional early-minus-late (EML) correlator and with a conventional dot-product (DP) discriminator. The noise performance of the EML, i.e. the variance of the discriminator output normalized by twice a squared amplitude of the signal, can be represented by:

$$\operatorname{var}\left(\frac{D_{EML}}{2A^2}\right) = \frac{B_L \Delta_{EL}}{2S/N_0}\left[1 + \frac{2}{(2-\Delta_{EL})(S/N_0)T}\right] \quad \text{Eq. (1.0)}$$

where $D_{EML}$ is the EML discriminator output, $B_L$ is the loop bandwidth, $\Delta_{EL}$ is the early-late spacing, $S/N_0$ is the signal-to-noise ratio, and T is the coherent integration time. Note that the squared amplitude by the signal is related to the signal-to-noise ratio and the noise variance in the loop using the equation: $A^2 = 2TS/N_0\sigma^2$.

Based on these equations, the noise performance of the DP discriminator can be derived as:

$$\operatorname{var}\left(\frac{D_{DP}}{2A^2}\right) = \frac{B_L \Delta_{EL}}{2S/N_0}\left[1 + \frac{1}{(S/N_0)T}\right] \quad \text{Eq. (2.0)}$$

Note that the output of the discriminator can be represented with noise $\eta$, by replacing the I-Q branches with their noisy counterparts, as follows:

$$D_{DiffTK}(\eta) = ((I_P + \eta_{IP})^2 + (Q_P + \eta_{QP})^2 - (I_L + \eta_{IL})^2 - (Q_L + \eta_{QL})^2) + (I_P + \eta_{IP})(I_{VL} + \eta_{IVL}) + (Q_P + \eta_{QP})(Q_{VL} + \eta_{QVL}) - (I_V + \eta_{IV})(I_E + \eta_{IE}) - (Q_E + \eta_{QE})(Q_L + \eta_{QL})$$

wherein $\eta_x$ are the I-Q noise components for x=E, L, P, and VL branches.

Note that $$\operatorname{var}(\eta_{IP}) = \operatorname{var}(\eta_{IE}) = \operatorname{var}(\eta_{IL}) = \operatorname{var}(\eta_{IVL}) = \sigma^2 \text{ and}$$

$$I_P^2 + Q_P^2 = A^2$$

$$I_L^2 + Q_L^2 = A^2(1 - \Delta_{EL})$$

$$I_E^2 + Q_E^2 = A^2(1 - \Delta_{EL})$$

$$I_{VL}^2 + Q_{VL}^2 = A^2(1 - 2\Delta_{EL})$$

Therefore, assuming zero mean noise, the variance of squared and cross-product terms can be derived as:

$$\operatorname{var}(D_{DiffTK}(\eta)) = 5A^2\sigma^2 + 6A^2\sigma^2(1 - \Delta_{EL}) + A^2\sigma^2(1 - 2\Delta_{EL}) + \operatorname{var}(\eta_{IP}^2) + \operatorname{var}(\eta_{QP}^2) + \operatorname{var}(\eta_{IL}^2) + \operatorname{var}(\eta_{QL}^2) + \operatorname{var}(\eta_{QVL}\eta_{QP}) + \operatorname{var}(\eta_{IVL}\eta_{IP}) + \operatorname{var}(\eta_{QL}\eta_{QE}) + \operatorname{var}(\eta_{IL}\eta_{IE})$$

Note also that:

$$\operatorname{var}(\eta_{IE} - \eta_{IL}) = 2(1-\rho)\sigma^2 = 2(1-(1-2\Delta_{EL}))\sigma^2 = 4\Delta_{EL}\sigma^2$$

where $\rho = (1 - 2\Delta_{EL})$ is the correlation index between early-late braches.

Thus, after manipulation, $$\operatorname{var}\left(\frac{D_{DiffTK}(\eta)}{2A^2}\right) = \frac{1}{2TS/N_0}\left[3 - 2\Delta_{EL} + \frac{1}{TS/N_0}\right] \quad \text{Eq. 3.0}$$

Equation 3.0 typically holds true for $\Delta_{EL} \leq 0.5$ because of the assumptions of the noise correlation between various branches. By comparing equation 3.0 with equations 1.0 and 2.0, it can be noted that the noise variance of the DiffTK operator may be slightly higher than that of the EML and the DP (i.e. the smaller the $\Delta_{EL}$ is, the bigger the gap between variance of DiffTK and the variance of DP).

Figure 5A:
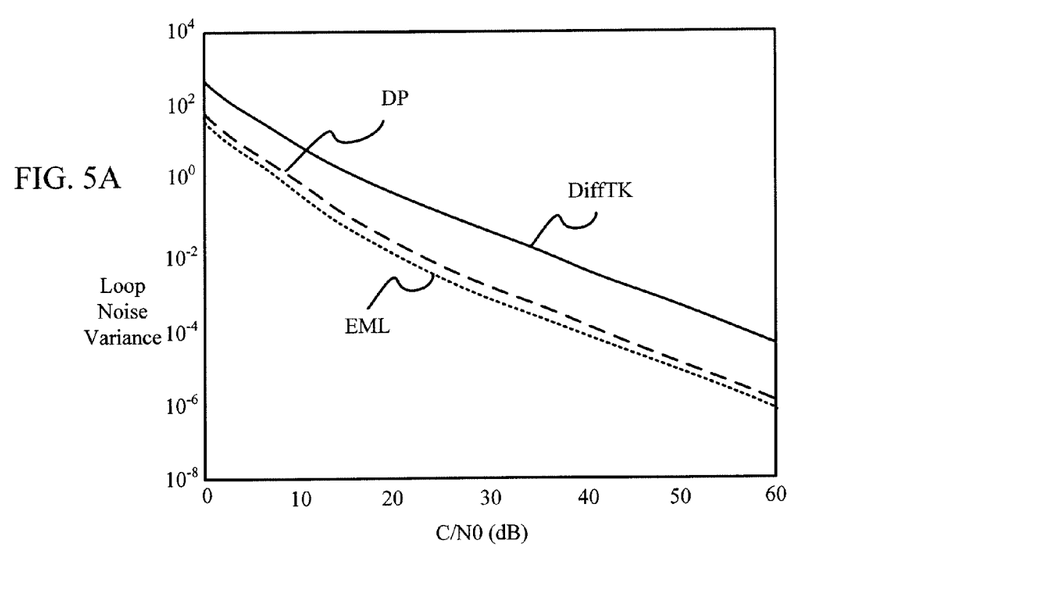
FIGS. 5A-5C illustrate the noise variance of an exemplary differential Teager-Kaiser discriminator compared to a narrow correlator and a dot-product discriminator for three levels of early-late spacing.
Figure 5B:
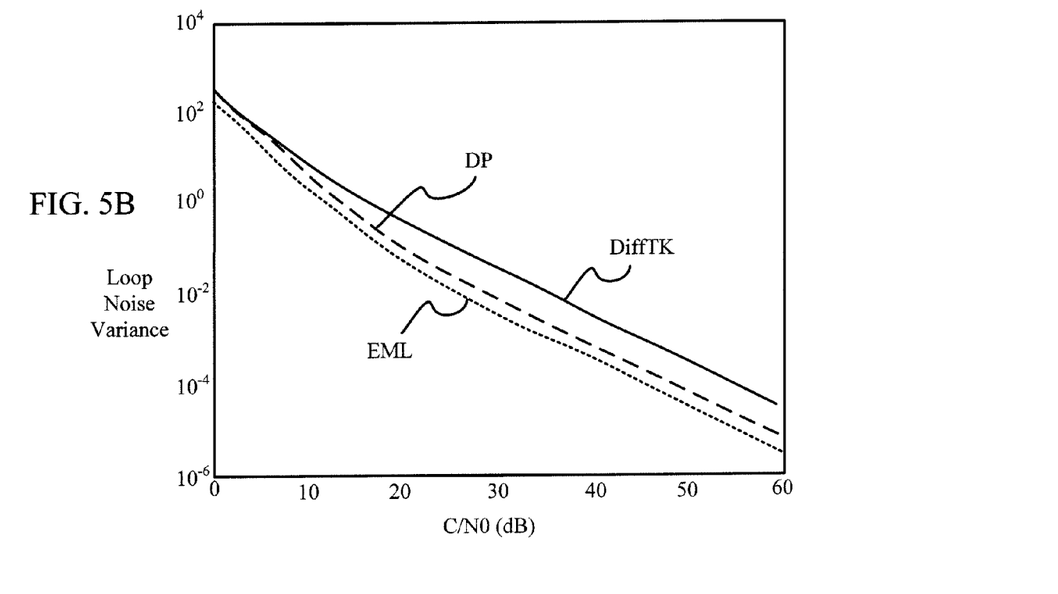
Figure 5C:
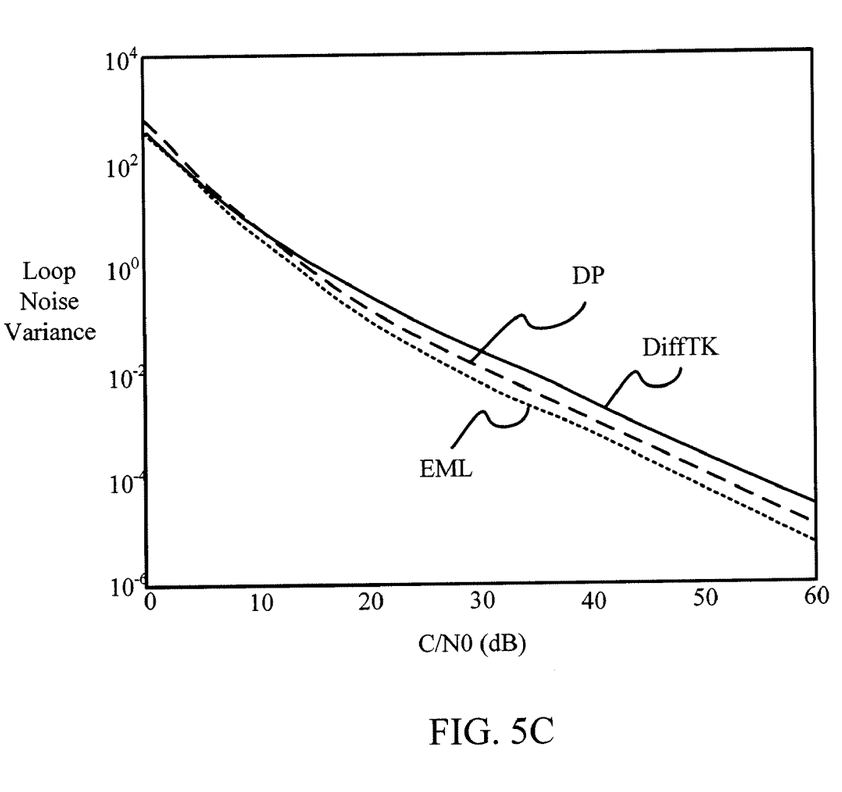

Thus, as demonstrated above, a tradeoff between enhancing performance in multipath conditions and increasing noise variance in single path channels exists. The noise variance (i.e. the loop noise variance vs. carrier-to-noise-density ratio (C/N0) (measured in dB)) of the DiffTK discriminator is illustrated in FIGS. 5A-5C for three levels of early-late spacing. Oftentimes within the navigation community C/N0 may also be measured in units of dB-Hz. Although the units may change, the relationship shown here with between the loop noise variance and the C/N0 remains the same. Specifically, FIG. 5A illustrates the noise variance of an exemplary DiffTK discriminator compared with a narrow correlator (EML) and a dot-product (DP) discriminator for an early-late spacing of 0.1 chips and a coherent integration time of T=20 ms. FIG. 5B illustrates the noise variance of an exemplary DiffTK discriminator compared with a narrow correlator (EML) and a dot-product (DP) discriminator for an early-late spacing of 0.5 chips and a coherent integration time of T=20 ms. FIG. 5C illustrates the noise variance of an exemplary DiffTK discriminator compared with a narrow correlator (EML) and a dot-product (DP) discriminator for an early-late spacing of 1 chip and a coherent integration time of T=20 ms. Note that in these graphs, the dot-product discriminator has slightly higher noise variance than the early-minus-late narrow correlator. In general, the higher the early-late spacing, the smaller the difference in variance. In one embodiment, an optimized tradeoff between the increase in multipath delay tracking accuracy and the increase in the noise variance can be achieved for 0.5 chip early-late spacing, which is a commercially-viable implementation for NSS receivers.

Note that the use of an additional complex correlator can increase the gate count of a NSS receiver by 20-30%. Therefore, the above-described DiffTK discriminator, which uses 4 complex correlators, does increase the gate count compared to either the EML correlator or the dot-product discriminator, both of which use only 3 complex correlators. However, this increase in gate is outweighed by the significant advantages in mitigating multipath, which is an increasing problem in NSSs. Moreover, other discriminators, e.g. the HRCs, use anywhere from 5-100 correlators, thereby dramatically increasing gate count while still unable to provide the multipath mitigation performance provided by the DiffTK discriminator.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. A code tracking loop circuit configured to detect timing differences between a pseudo-random noise (PRN) modulated navigation satellite system (NSS) signal and a reference PRN signal, the circuit comprising:
    a correlator block configured to generate four input terms, wherein each input term is a correlation between a phase shifted reference PRN signal and the NSS signal, wherein the four input terms consist of an early (E) input term, a prompt (P) input term, a late (L) input term, and one of a very early (VE) input term and a very late (VL) input term; and
    a discriminator for using the four input terms to determine phase differences between the PRN modulated NSS signal and the reference PRN signal, the discriminator being implemented with a differential Teager-Kaiser operator,
    wherein a discriminator output corresponds to at least a portion of a timing difference between the reference PRN signal and the PRN modulated NSS signal.

2. The circuit of claim 1, further comprising:
    a clock generator configured to generate a code timing clock based on the discriminator output; and
    a code generator configured to compute the reference PRN signal and to generate a set of phase shifted reference PRN signals based on the reference PRN signal and the code timing clock.

3. The circuit of claim 1, wherein the correlator block is configured to receive a first data signal, a second data signal, the second data signal being a phase-shifted version of the first data signal, and a set of phase shifted reference PRN signals, and to generate a first set of correlation signals and a second set of correlation signals,
    wherein the first set of correlation signals is based on the first data signal and the phase shifted reference PRN signals, the second set of correlation signals is based on the second data signal and the phase shifted reference PRN signals, and the first set of correlation signals is a phase-shifted version of the second set of correlation signals.

4. A navigation satellite system (NSS) receiver configured to detect information within pseudo-random noise (PRN) modulated electromagnetic signals, the NSS receiver comprising:
    an antenna configured to receive a plurality of electromagnetic signals and convert the electromagnetic signals into electrical signals;
    an analog subsystem configured to selectively amplify the electrical signals, shift a specific frequency range within the electrical signals to generate an intermediate frequency signal, and sample the intermediate frequency signal into a digital converted signal;
    at least one tracking block configured to minimize timing differences between a reference PRN signal and the converted digital signal, each tracking block including at least one code tracking loop, wherein the code tracking loop generates four input terms corresponding to correlations between the digital converted signal and a phase shifted reference PRN signal, wherein the four input terms consist of an early (E) input term, a prompt (P) input term, a late (L) input term, and one of a very early (VE) input term and a very late (VL) input term, the code tracking loop including:
    a correlator block configured to generate four input terms, wherein each input term is a correlation between a phase shifted reference PRN signal and the NSS signal; and
    a discriminator for using the four input terms to determine phase differences between the PRN modulated NSS signal and the reference PRN signal, the discriminator being implemented with a differential Teager-Kaiser operator,
    wherein a discriminator output corresponds to at least a portion of a timing difference between the reference PRN signal and the PRN modulated NSS signal.

5. The NSS receiver of claim 4, further comprising:
    a clock generator configured to generate a code timing clock based on the discriminator output; and
    a code generator configured to compute the reference PRN signal and to generate a set of phase shifted reference PRN signals based on the reference PRN signal and the code timing clock.

6. The NSS receiver of claim 4, wherein the correlator block is configured to receive a first data signal, a second data signal, the second data signal being a phase-shifted version of the first data signal, and a set of phase shifted reference PRN signals, and to generate a first set of correlation signals and a second set of correlation signals,
    wherein the first set of correlation signals is based on the first data signal and the phase shifted reference PRN signals, the second set of correlation signals is based on the second data signal and the phase shifted reference PRN signals, and the first set of correlation signals is a phase-shifted version of the second set of correlation signals.

* * * * *